United States Patent Office 3,450,570
Patented June 17, 1969

3,450,570
METHOD OF PRODUCING SEMI-CONDUCTIVE ELECTRONEGATIVE ELEMENT OF A BATTERY
John J. Root, Bronx, N.Y., assignor, by mesne assignments, to Molecular Energy Corporation, Farmingdale, N.Y., a corporation of New York
No Drawing. Filed Jan. 23, 1967, Ser. No. 610,802
Int. Cl. H01m 13/08, 13/00
U.S. Cl. 136—120                                                       11 Claims

ABSTRACT OF THE DISCLOSURE

This invention relates to an electronegative element of a battery which is produced by heating a finely divided mixture of cupric halide and sulfur at a temperature of at least 250° F., such as within the range of 250° to 265° F. The cupric halide and sulfur are mixed in the proportion by weight of 1 part of cupric halide to 0.03 to 0.5 part of sulfur. The cupric halide may be, for example, cupric fluoride, cupric chloride or cupric bromide. The conductivity of the electronegative element is increased when finely divided cupric sulfide or metallic copper is added to the mixture prior to heat treatment. The electronegative element of this invention is chemically very strong and ceramic-like in hardness and is insoluble in water. It has excellent conductivity characteristics despite the fact that the two primary components, sulfur and a cupric halide such as cupric fluoride, are poor conductors of electricity. An electronegative element produced from cupric fluoride and sulfur when in combination with an electolyte and an electropositive element such as magnesium, it produces an electric potential of between 1.9 and 2 volts at a current of 250 to 300 milliamps per square inch and at an approximately 3 g. of material per amper-hour.

An important factor in producing batteries is to have the electronegative element very electrically conductive. While carbon and other conductive materials can be added to increase the conductivity of an element, the internal resistance of the resulting element increases very materially. Moreover, if carbon particles are employed, they do not contribute to maintaining a matrix such as a cupric fluoride matrix compressed. If an organic substance is added, the resistance is increased to a significantly greater extent. A copper halide such as cupric fluoride is a very good electronegative element. However, cupric fluoride is very difficult to compress into a solid compact matrix. Another problem encountered with cupric halide such as cupric fluoride as an electronegative element is that as soon as an electrical discharge takes place, for example, with sodium chloride as an electrolyte, the finely dispersed copper particles start migrating toward the electropositive element, for example, a magnesium electrode. Once such finely divided copper particles are on the magnesium or other positive electrode, the potential drops very significantly.

In accordance with this invention, an electronegative element is produced which has good conductivity, which has relatively low internal resistance, which is a solid compact matrix and which prevents the migration of finely dispersed copper particles going toward the electropositive element in the discharge of a battery utilizing such electronegative elements. The electronegative element of this invention is produced by initially mixing sulfur and a cupric halide such as cupric fluoride in the proportion by weight of 1 part of cupric halide to 0.03 to 0.5 part of sulfur. Desirably, the mixture is ball-milled to a finely divided mixture. Conveniently, an inert solvent having a boiling point below 250° F. is added in sufficient amounts to form a briquette. The resulting briquette is heated to a temperature of at least 250° F., such as within the range of 250–265° F. The temperature of at least 250° F. may vary over wide limits, such as 500° F. and above, depending, inter alia on the size of the element, the temperature prior to heat treatment and the pressure at which the heat treatment is conducted. In order to prevent cracking, the finely divided mixture after being formed into a briquette is gradually raised over a period of 2 to 7 hours to 250° F. and then retained at at least 250° F., such as within the range of 250 thru 265° F. until the briquette changes from a blue-gray color to a black color. Conveniently, the solvent employed to produce the briquette is water or ethanol.

Cupric sulfide or finely divided metallic copper may be added to the mixture of sulfur and cupric halide. This addition is in the proportion of 2 to 15% of the cupric halide and improves the conductivity of the resulting electronegative element. Desirably, there is added a small quantity of sulfur in excess of the stoichiometric amount required for combination with the cupric halide when cupric sulfide is employed. After the cupric sulfide or metallic copper or both are added to the cupric halide and sulfur, the entire mixture is ball-milled together to a fine powder. The inert solvent such as water or alcohol is then added and the mixture is compressed to a solid briquette. It is then heat treated in excess of 250° F. as heretofore described.

A temperature in excess of 250° F. in the heat treatment is critical. The maximum electrical conductivity is manifested when a temperature in excess of 250° F. is maintained until the color changes from blue-gray to black. One criterion to determine when the electronegative element is satisfactorily heat treated and approaches or is at its optimum stage is to continue the heat treatment until the electrical conductivity of the element attains certain values. A potential of 1.9 to 2.0 volts against magnesium with sodium chloride as an electrolyte is obtained for elements produced from a mixture of cupric fluoride and sulfur. This potential of 1.9 to 2.0 volts is equivalent to silver chloride against magnesium. When cupric bromide is the cupric halide of the mixture heat treated, the potential is within the range of 1.6 to 1.7 volts against magnesium; with cupric iodide, it would be 1.2 to 1.4; and with cupric chloride, it would be 1.4 to 1.5 volts.

An alternative procedure for producing the electronegative elements of this invention involves at least two heat treatments. In this alternative procedure, a mixture of the sulfur and cupric halide, such as cupric fluoride is ball-milled to obtain a finely divided mixture. The resulting mixture is heat treated as described by heating to at least 250° F. The heat treated product is then ball-milled after which it is again heat treated by heating to at least 250° F. as earlier described. The double heat treated product is then compressed to form the desired electronegative element. This double heat treatment results in a much smaller volume occupied by the same quantity of mixture than in the single heat treatment procedure.

A more comprehensive understanding of this invention is obtained by reference to the following example.

One gram of cupric fluoride and 0.3 g. of sulfur are ground and well mixed in a ball-mill. This mixture is then pressed into a briquette by adding thereto a small amount of water. Alternatively, the mixture may be deposited on a copper screen. With either form, the briquette or the screen are placed in an oven at a temperature within the range of 250 to 265° F. for approximately 1 hour. Before the treatment, the briquette or mixture on the screen is a blue-gray color. It is subjected to the heat treatment at least for a period until it changes to a black color.

The electrical conductivity before heat treatment was about 200,000 ohms per square millimeter. After the heat treatment, the conductivity had changed to 0.1 ohm per square millimeter. The potential of the heat treated element against magnesium with sodium chloride in an electrolyte is 1.9 to 2.0 volts.

What is claimed is:

1. The methods of producing an electronegative element of a battery comprising heating at a temperature of at least 250° F. a finely divided mixture of cupric halide and sulfur in the proportions by weight of 1 part of cupric halide to .03 to .5 part of sulfur until the mixture has changed its color from blue-gray to black.

2. The method of producing an electronegative element of a battery in accordance with claim 1 in which the temperature is between 250 and 265° F. at atmosphere pressure.

3. The method of producing an electronegative element of a battery in accordance with claim 1 in which cupric sulfide or finely divided couper is incorporated with some free sulfur in said mixture prior to heating at a temperature of at least 250° F.

4. The method of producing an electronegative element of a battery in accordance with claim 1 in which the temperature is gradually raised in temperature over a period of 2 to 7 hours to 250° F. and then maintained in excess of 250° F.

5. The method of producing an electronegative element of a battery in accordance with claim 1 in which said finely divided mixture is bound together with an inert solvent having a boiling point less than 250° F.

6. The method of producing an electronegative element of a battery in accordance with claim 1 in which the cupric halide is cupric fluoride.

7. The method of producing an electronegative element of a battery in accordance with claim 1 in which the heat treated product is finely divided, subjecting the resulting finely divided mixture to a second heat treatment by heating to at least 250° F. and compressing the second heat treated product.

8. The method of producing an electronegative element of a battery in accordance with claim 1 in which the cupric halide is cupric bromide.

9. The method of producing an electronegative element of a battery in accordance with claim 1 in which the cupric halide is cupric chloride.

10. An electronegative element of a battery produced in accordance with the method recited in claim 1.

11. A battery comprising an electropositive element and an electronegative element, said electronegative element being produced in accordance with the method recited in claim 1.

References Cited

UNITED STATES PATENTS

| | | | |
|---|---|---|---|
| 1,489,328 | 4/1924 | Martus | 136—116 |
| 3,132,054 | 5/1964 | Carson | 136—137 |
| 3,205,096 | 9/1965 | Honer | 136—100 |

ALLEN B. CURTIS, *Primary Examiner.*

A. SKAPARS, *Assistant Examiner.*

U.S. Cl. X.R.

23—138, 206; 252—518